(12) United States Patent
Victor et al.

(10) Patent No.: US 6,651,030 B2
(45) Date of Patent: Nov. 18, 2003

(54) METHOD AND SYSTEM FOR COLLECTING AND RETRIEVING TIME-SERIES, REAL-TIME AND NON-REAL-TIME DATA

(75) Inventors: Hendrik Johannes Victor, Rancho Santa Margarita, CA (US); Mikhail Avergun, San Diego, CA (US); Llewellyn John Knox-Davies, Rancho Santa Margarita, CA (US)

(73) Assignee: Invensys Systems Inc., Foxboro, MA (US)

( * ) Notice: Subject to any disclaimer, the term of this patent is extended or adjusted under 35 U.S.C. 154(b) by 0 days.

(21) Appl. No.: 10/178,002

(22) Filed: Jun. 21, 2002

(65) Prior Publication Data

US 2002/0198679 A1 Dec. 26, 2002

Related U.S. Application Data

(60) Provisional application No. 60/300,172, filed on Jun. 22, 2001.

(51) Int. Cl.[7] .............................................. G06F 15/177
(52) U.S. Cl. ......................... 702/172; 709/224; 707/10
(58) Field of Search ................................. 702/172, 176; 709/224, 201, 216; 707/500.1

(56) References Cited

U.S. PATENT DOCUMENTS

| | | | |
|---|---|---|---|
| 5,410,698 A | * | 4/1995 | Danneels et al. ........... 709/200 |
| 5,550,976 A | | 8/1996 | Henderson et al. |
| 5,623,690 A | | 4/1997 | Palmer et al. |
| 5,745,693 A | | 4/1998 | Knight et al. |
| 6,188,962 B1 | * | 2/2001 | Morgan et al. ............... 702/14 |

* cited by examiner

*Primary Examiner*—Kamini Shah
(74) *Attorney, Agent, or Firm*—Leydig, Voit & Mayer, Ltd.

(57) ABSTRACT

Disclosed is a data collection and retrieval system that puts data produced by real-time and non-real-time data sources into parallel "streams" or data files. Real-time data points are stored with time stamps in data files and non-real-time data points with time stamps are stored in other data files. Real-time data points are stamped with the times at which their data were collected. Non-real-time data points are stored in time-sequential order, the sequence time being the time of relevance rather than the time of collection. By referencing the streams that contain data points relevant to a given period, header files facilitate coordinated retrieval of data from multiple parallel streams. The time stamps allow the data points to be merged together into one coordinated, time-sequential data stream for analysis. The parallel stream data collection and retrieval technique allows operators to add or delete data sources without shutting down the process being monitored.

37 Claims, 6 Drawing Sheets

FIG. 3a

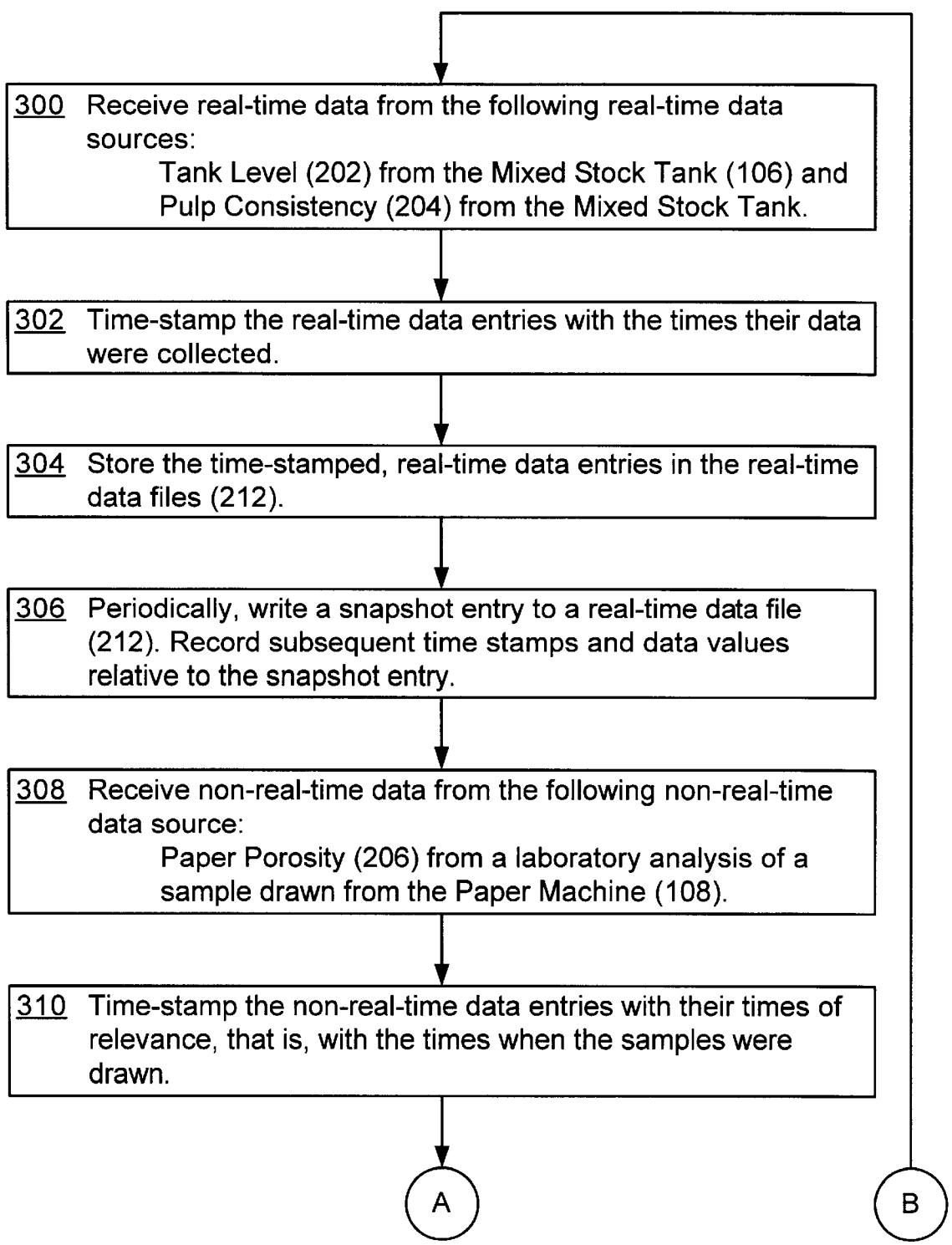

| 300 | Receive real-time data from the following real-time data sources:<br>    Tank Level (202) from the Mixed Stock Tank (106) and Pulp Consistency (204) from the Mixed Stock Tank. |

| 302 | Time-stamp the real-time data entries with the times their data were collected. |

| 304 | Store the time-stamped, real-time data entries in the real-time data files (212). |

| 306 | Periodically, write a snapshot entry to a real-time data file (212). Record subsequent time stamps and data values relative to the snapshot entry. |

| 308 | Receive non-real-time data from the following non-real-time data source:<br>    Paper Porosity (206) from a laboratory analysis of a sample drawn from the Paper Machine (108). |

| 310 | Time-stamp the non-real-time data entries with their times of relevance, that is, with the times when the samples were drawn. |

(A)  (B)

| 414 | As desired, display the retrieved data entries or analyze them and display the results. |

METHOD AND SYSTEM FOR COLLECTING AND RETRIEVING TIME-SERIES, REAL-TIME AND NON-REAL-TIME DATA

CROSS-REFERENCE TO RELATED APPLICATION

The present application claims the benefit of U.S. Provisional Patent Application No. 60/300,172, filed on Jun. 22, 2001, which is hereby incorporated in its entirety by reference.

TECHNICAL FIELD

The present invention is related generally to data storage techniques, and, more particularly, to collecting and retrieving data produced by a number of different data sources.

BACKGROUND OF THE INVENTION

Industry increasingly depends upon data acquisition and control systems to improve the efficiency of running industrial processes while lowering their costs. Data acquisition begins when a number of sensors measure aspects of an industrial process and periodically report their measurements back to a data collection and control system. The word "measurement" should be construed very broadly: the "measurement" produced by a sensor may be, for example, an inventory of packages waiting in a shipping line or a photograph of a room in a factory. Sophisticated software examines the incoming data, produces status reports, and, in many cases, responds by sending commands to actuators that change how the industrial process is running. The data produced by the sensors also allow an operator to tailor the process in response to varying external conditions, to catch incipient equipment failure, and to move equipment into and out of service as required. A simple and familiar example of a data acquisition and control system is the thermostat: a thermometer measures the current air temperature, the measurement is compared with a desired temperature range, and, if necessary, commands are sent to a furnace or air conditioner to move the actual air temperature into the desired range.

Of course, many industrial processes are much more complex than this simple example. Increasing process complexity is controlled by increasing the sophistication of the control software and by increasing the number of data sensors and actuators. It is not unheard of to have tens of thousands of sensors monitoring all aspects of a multi-stage process. These sensors are of varied type to report on varied characteristics of the process. Their outputs are similarly varied in the meaning of their measurements, in the amount of data sent for each measurement, and in the frequency of their measurements. As regards the latter, for accuracy and to enable quick response some of these sensors take one or more measurements every second. When multiplied by tens of thousands of sensors, this results in so much data flowing into the control system that sophisticated data management techniques are required. One currently popular technique is "data streaming." Here, incoming data are immediately stored, in order by arrival time, in one or more data files. Storing data in time-sequential order allows the control system to quickly access data relevant to the state of the process at a chosen time and to make an analysis accordingly.

However, current data streaming techniques achieve their efficiencies by trading off some flexibility. A first problem caused by this stems from the interrelationship of a complicated industrial process with other processes and with the processing environment. This interrelationship may itself be very complicated and may be constantly changing. To accommodate change, operators would like to frequently add, move, or remove sensors and to integrate the sensors' outputs into the control system. Because current data streaming techniques are optimized for efficiently managing large, ongoing data streams, they are often unable to readily accommodate configuration changes. Indeed, some data acquisition and control systems must be shut down entirely to reconfigure them for new or different sensors and actuators. As the industrial process depends upon its data acquisition and control system and cannot run reliably without it, shutting down the system involves a very expensive shutdown of the entire industrial process. Thus, the limited flexibility of data streaming often inhibits operators from making quick reconfigurations and from readily taking advantage of advances in data acquisition technology.

A related problem with data streaming stems from the varied types of data acquired by an extensive system. Current data streaming techniques do not comfortably handle so-called "non-real-time data." The type of sensors discussed above take their measurements in "real time." For example, at 12:34:56 p.m., a level sensor records the water level in a holding tank. The measurement produced, the water level, is relevant to the exact time when the measurement was taken. Contrast that with the following example of non-real-time data. At 3:00:00 p.m., a technician dips a collecting cup into a vat and draws a sample of the vat's contents. The contents are to be subjected to a laboratory analysis that is either too sophisticated for a real-time sensor to perform or that is performed so infrequently that the cost of an automated real-time sensor is not justified. In any case, the technician takes the sample to the laboratory and performs the analysis. The results of the analysis are not available until 4:30:00 p.m. at which time the technician would like to enter the results into the data acquisition system. Those results are not relevant to the state of the vat at 4:30:00 p.m., but rather to the time when the sample was drawn at 3:00:00 p.m. Traditional data streaming cannot readily back up and store the analysis results with real-time data produced around the results' "time of relevance," that is, at 3:00:00 p.m. Instead, data streaming stores the analysis results when they become available, storing them along with real-time data produced at 4:30:00 p.m. When, later in the day, the control system attempts to analyze what was the state of the process at 3:00:00 p.m., it may miss the results of the laboratory analysis because those results are not stored in time sequence with the real-time data points. Analysis becomes much more difficult, and the value of non-real-time data points is consequently greatly reduced.

What is needed is a way to store real-time and non-real-time data that allows new data sources to be added or removed and that allows the real-time and non-real-time data points to be retrieved for analysis in a time-coordinated fashion.

SUMMARY OF THE INVENTION

In view of the foregoing, the present invention presents a data collection and retrieval system that puts data produced by real-time and non-real-time data sources into parallel "streams" or data files. The benefits of data streaming are retained by storing real-time data points with time stamps in one or more data files and non-real-time data points with time stamps in other data files. These files form parallel streams of data. The parallel streams are associated with one another and with a particular monitoring period. To access data relevant to a particular time period, data from the parallel streams associated with that time period are retrieved in a coordinated fashion based on their time stamps.

Real-time data points are stamped with the times at which their data were collected. To make data storage and retrieval efficient, these data points are stored in a time-sequential order as soon as they reach the data collection system. Non-real-time data points are time-stamped with their times of relevance rather than with the potentially much later time at which the data points reach the data collection system. The non-real-time data points are stored in time-sequential order in their own data files, the sequence time being the time of relevance rather than the time of collection. Because there are typically far fewer non-real-time than real-time data points, the efficiencies and limitations of data streaming need not be applied to the non-real-time data files. It is thus feasible to back up within a non-real-time data stream to insert a data point at its proper time of relevance.

Upon retrieval, an operator uses header files to access data for a given monitoring period. By referencing the streams that contain data points relevant to the monitoring period, these header files facilitate coordinated retrieval of data from multiple parallel streams. The time stamps in the parallel stream files allow the data points to be merged together into one coordinated, time-sequential data stream for analysis. The header files can even refer to an external database so that its data can be treated as a parallel stream and merged with the process monitoring data.

The parallel stream data collection and retrieval technique allows operators to add or delete data sources without shutting down the process being monitored. When a new source is added, its data, whether real-time or non-, are added to the data streams flowing into the various data files without disrupting existing streams. Operators can also incorporate additional parallel streams containing multiple versions of process monitoring data.

The parallel stream framework allows for great flexibility in the contents of the streams. For example, testing may show that a sensor has been producing measurements with a consistent deviation from the correct values. Rather than going back and correcting all of the data points produced by the faulty sensor, a new parallel stream of correction factors is produced. Data analysis programs combine the faulty sensor readings from the original stream with the correction factors from the new stream to produce the corrected results.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a and 3b together form a flowchart of an exemplary method for collecting and storing process data.

DETAILED DESCRIPTION OF INVENTION

Figure 1:
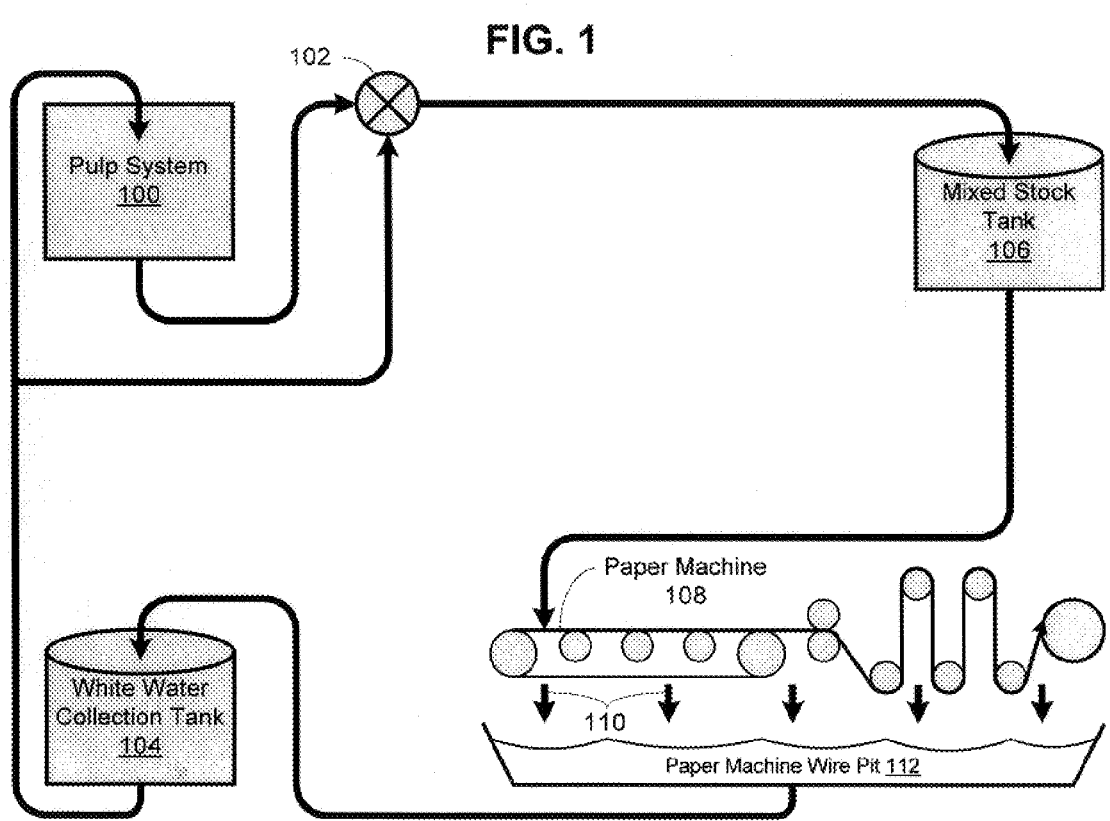
FIG. 1 is a block diagram of an exemplary industrial process, here a greatly simplified paper-making process.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

To frame the present discussion, FIG. 1 depicts, in greatly simplified form, an industrial process. Note that the methods of the present invention may be applied in non-industrial settings and are usable regardless of the meaning of the data coming into the control system. The paper-making process of FIG. 1 begins with a pulp system 100 converting trees into a slurry of wood fibers in water. The process of taking wood, pulping it into fibers, refining the fibers, and controlling the parameters of the resulting slurry is well known in the art and is incorporated into box 100. The slurry is piped to a proportioning valve 102. The proportioning valve 102 controls the ratio of a mixture of slurry from the pulp system 100 and recycled slurry from the white water collection tank 104. The mixture is sent to a mixed stock tank 106 and then goes to the paper machine 108. The slurry falls onto a constantly moving mesh screen conveyor, or "wire," of the paper machine 108 and there forms a mat. Excess water with some fibers are removed from the mat, and the mat becomes paper. The excess water and fibers fall (flow 110) into the paper machine wire pit 112 and are pumped to the white water collection tank 104. From there, the water and fibers are recycled back into the pulp system 100.

The quality of paper produced by the paper machine 108 is determined in large part by the characteristics of the input slurry coming from the mixed stock tank 106. In the greatly simplified example of FIG. 1, that input slurry is controlled by altering the mixture as set by the proportioning valve 102.

Figure 2:
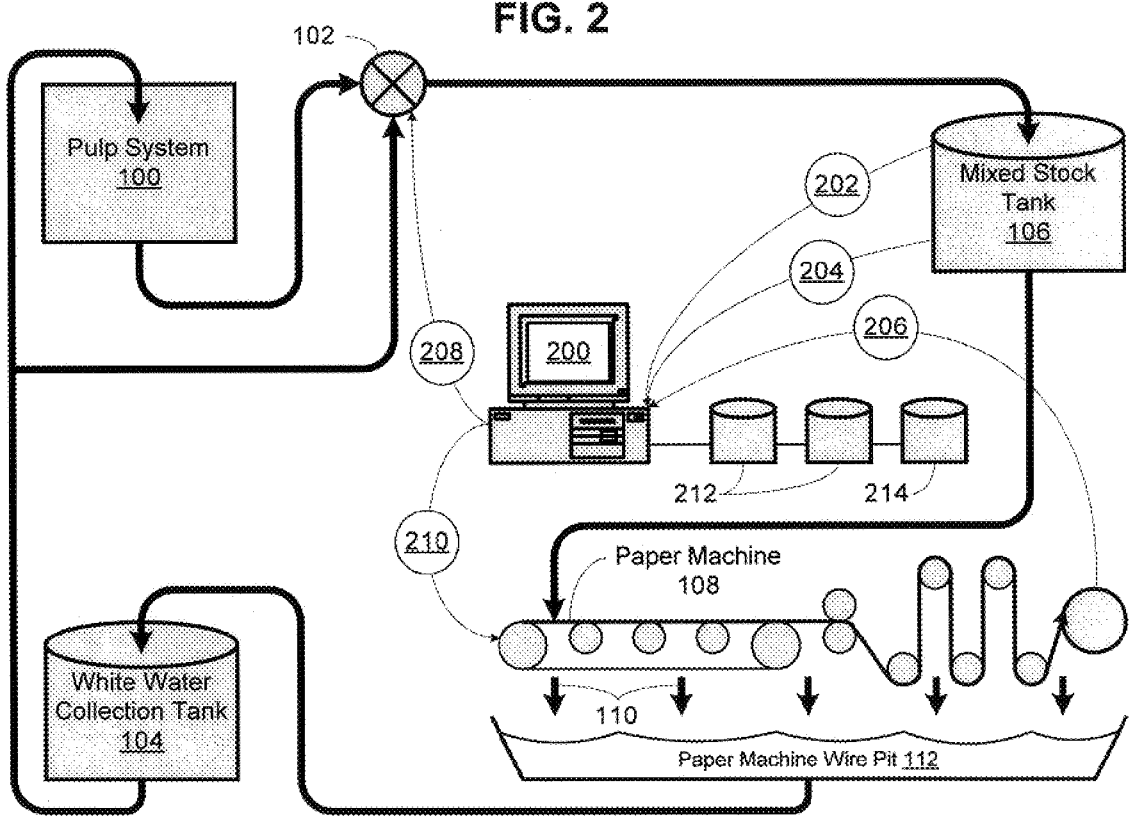
FIG. 2 is a block diagram that adds a data acquisition and control system to the exemplary industrial process of FIG. 1.

FIG. 2 adds to FIG. 1 a few process sensors (or "data sources") and actuators. A computing device 200 receives from the sensors measurements useful for analyzing and controlling the quality of the paper produced by the paper machine 108. For clarity's sake, the computing device 200 is depicted as a personal computer in FIG. 2, but its functions could be implemented on any control technology, including servers, multiprocessor systems, microprocessor-based systems, minicomputers, mainframe computers, and distributed computing environments that include any of the above systems or devices.

FIG. 2 shows two real-time data sources: data source 202 measures the level of slurry in the mixed stock tank 106, and data source 204 measure the consistency of that slurry. These real-time measurements are sent to the computing device 200 which stores them in real-time data files 212, time-stamped with the time the data were collected. One non-real-time data source is shown: data source 206 produces a measurement of paper quality, the paper's porosity. To measure porosity, a technician takes a small sample of the paper from the paper machine 108, analyzes the sample in a laboratory, and then enters the laboratory results into the computing device 200. The results are stored in a non-real-time data file 214, time-stamped with the time the sample was taken rather than with the potentially much later time when the results of the laboratory analysis become available.

In addition to storing the measurements produced by the data sources 202, 204, and 206, the computing device 200 runs a predictive model based on the real-time measurements that compares the measured properties with desired value ranges set for each property. (Usually, the non-real-time measurements are not available in time to be of use to the predictive model.) In order to keep the properties within their desired value ranges, the model predicts the effect on the properties of adjusting one or more operational parameters of the industrial process. Then, the model directs actuators to adjust the operational parameters in accordance with its predictions. In the simplified example of FIG. 2, the predictive model can adjust two operational parameters. Via the actuator path 208, the predictive model controls the ratio of the slurries from the pulp system 100 and from the white water collection tank 104. The speed of the paper machine 108 is controlled via the actuator path 210. In an actual paper-making plant, the predictive model may be responsive to other data sources (numbering perhaps in the tens of thousands), both real-time and non-real-time, and may be able to adjust other operational parameters than those shown in FIG. 2, but these two real-time data sources (mixed stock tank level and mixed stock tank consistency) and two adjustable parameters (slurry proportion and paper machine speed) serve for illustrative purposes.

Figure 3B:
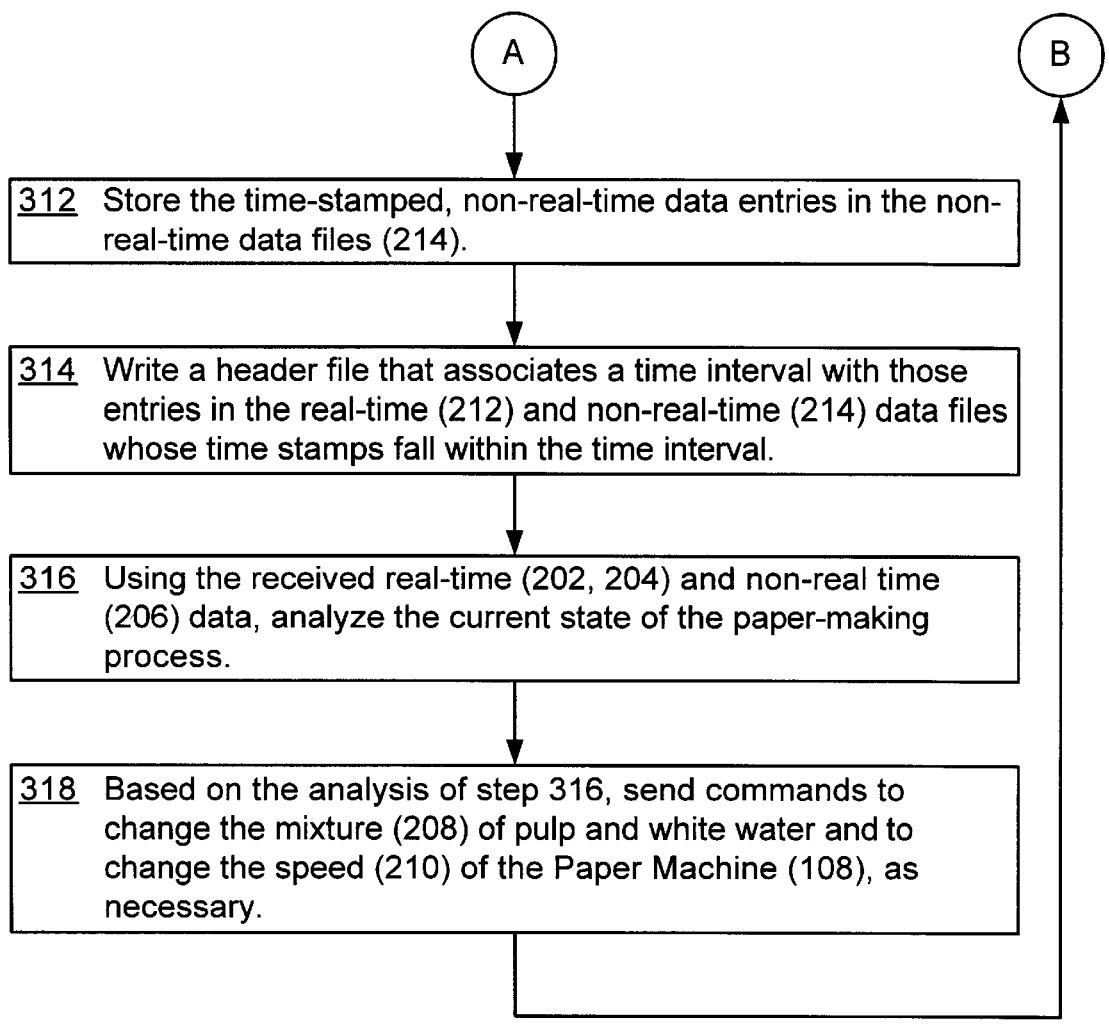

With the exemplary process environment of FIGS. 1 and 2 in mind, turn now to FIGS. 3a and 3b. These Figures present an embodiment of the methods of the present invention as they pertain to collecting and storing data. For purposes of discussion, the flowchart of FIGS. 3a and 3b presents aspects of the method as steps following one another in an endless loop. In some embodiments, the "steps" of FIGS. 3a and 3b may occur concurrently, consecutively, or in some combination. Some steps may be performed more often than others, while some steps may not be performed at all.

The method begins in step 300. A data collector running on the computing device 200 receives measurements from real-time data sources. Data sources differ in how much data they produce, in the type of data they produce, and how often they produce data. Each incoming package of data is time-stamped in step 302 with the time the data were collected. Many sophisticated data sources send this time stamp along with the measurement. Other, especially older, sources do not provide a time stamp, so the data collector stamps the entry with the time that it receives the measurement.

A real industrial process environment produces so many data entries that very efficient data storage techniques, such as data streaming, are used just to keep up with the flood. In step 304, the time-stamped real-time data entries are stored in one or more real-time data files 212. In some embodiments, each data file 212 is dedicated to receiving data from one data sensor or from one family of related data sensors. Other embodiments store all incoming real-time data entries in one data file 212. When a data file 212 contains data from a single data source, the title or header of the data file 212 usually indicates that data source. For data files 212 that contain data from several sources, some method is used to associate each data entry with its data source. This may be accomplished with special records in the file or by including a data source field in each data entry. In any case, the entries are stored as quickly as possible, generally in the order in which they arrive at the data collector.

Step 306 presents an option that may improve the efficiency of the storage and retrieval of the real-time data entries. Periodically, say once per minute, a special entry is written to each data file 212. This special entry is called a "snapshot" and at a minimum contains a time stamp. The real-time data entries are then time-stamped with the time elapsed (called the "time delta") since the most recent previous snapshot entry. This technique allows a smaller data field for the time stamp in each real-time data entry because that field need only store the time delta, often no more than a minute, rather than the full calendar date and time. When time stamps are accurate to a millisecond and when hundreds of data entries are written every second, this technique saves an enormous amount of storage space.

A snapshot entry may apply to all of the following data entries (until the next snapshot) or may be specific to data entries from a specific data source. In the latter case, the snapshot entry may contain a data value. This is simply the most recent value received from the data source at the time the snapshot is written.

Step 308 is similar to step 300 except that here non-real-time data are received. These data entries often come from laboratory analyses. Step 310 time-stamps the entries with their "time of relevance," that is, the time in the process that they measure. For example, this is the time at which a sample is drawn from the paper machine 108 for subsequent laboratory analysis.

These data entries are called "non-real-time" because of the lag between when a sample is taken and the time when the results are available for entry into the data collector. This lag prevents these entries from being inserted into their proper place in the real-time data files 212 written in step 304. The highly efficient data storage techniques used in step 304 to handle the huge number of real-time data entries do not permit "backing up" the real-time data files 212 to insert the non-real-time data entries at their time of relevance. Instead, step 312 of FIG. 3b stores the non-real-time data entries in their own data files 214. Just as for real-time data, the data collection system may choose to store non-real-time data in one or more files 214, the choice based on issues of efficiency. In some embodiments, the non-real-time data files 214 are backed up to allow the insertion of the non-real-time data entries in their proper sequence by their times of relevance. In other embodiments, the non-real-time data files 214 are databases that key their entries by their times of relevance. This flexibility is possible with the non-real-time data entries because there are generally so many fewer of them than there are real-time data entries. Thus, efficiency of storing the non-real-time data entries is not as much of a concern as it is with the real-time data entries, and some efficiency can be traded off for increased flexibility. The ability to use different storage techniques for different types of data entries allows great increases in efficiency and flexibility for the data collection system as a whole.

Though not shown in FIG. 3b, snapshot entries may be written to the non-real-time data files 214 just as they are written to the real-time data files 212 in step 306.

Each of the data files, real-time or non-, is a separate but parallel stream of data entries being written to record some aspects of the process environment. In step 314, header files are written to bring the parallel streams into close association. When performing an analysis of the state of the process at a given time (see step 316 and the discussion of FIGS. 4a and 4b), all of the streams that contains data entries for that given time should be examined. The header files written in step 314 associate a time interval with real-time and non-real-time data entries whose time stamps fall within that time interval.

This use of header files to associate multiple data streams with one another and with a time interval enables the flexibility mentioned above of allowing different data storage techniques for different types of data. In some embodiments, headers extend that flexibility by associating a time interval with parallel streams that are created by methods other than those illustrated by steps 300 through 312. As a first example, a database created outside of the process environment contains information relevant to analyzing the process. A header file treats that database as yet another parallel stream and associates it with the other streams containing data entries for the time interval. For a second example, consider a faulty data source that produces measurements with a consistent deviation from the true. Say that the data sensor 202 when measuring the level of the slurry in the mixed stock tank 106 always reports a measurement that is 100 gallons higher than the actual level. Two days after it began mismeasuring, the fault is detected, and the sensor 202 is fixed or replaced. The real-time data files 212 now contain two days of incorrect slurry level measurements. Rather than going back and correcting those data files 212 (which may be impractical in some implementations), a new stream is set up with a negative 100 gallon correction factor. A header file associates this new correction factor stream with the two-day faulty period. Whenever a data entry from sensor 202's two-day faulty period is retrieved, the header file also pulls up a correction factor and combines it with the data entry to produce the corrected result. These two examples show some of the benefits of the flexibility of parallel streams achieved through the means of header files.

Having acquired data from the sensors, the computing device 200 analyzes the data in step 316. At any moment, this analysis is potentially incomplete because some non-real-time data entries relevant to the analysis are not yet available. In some embodiments, the analysis program predicts the non-real-time data based on the most recent available measurements and corrects its predictions as new non-real-time data entries become available.

The analysis of step 316 is used in step 318 to control the process by sending commands to the actuators. As mentioned above, process control is usually based on an analysis of the real-time data only because the non-real-time data are not available quickly enough for the short response time needed by the control system. In the example of FIGS. 1 and 2, this control merely consists of altering the setting of the proportioning valve 102 (via actuator 208) and changing the speed of the paper machine 108 (via actuator 210). The goal of the analysis and control program is to keep measured process characteristics within acceptable ranges.

As mentioned at the outset of the discussion of FIGS. 3a and 3b, the process of these steps repeats continuously, albeit not necessarily in the sequence depicted in these Figures.

Figure 4A:
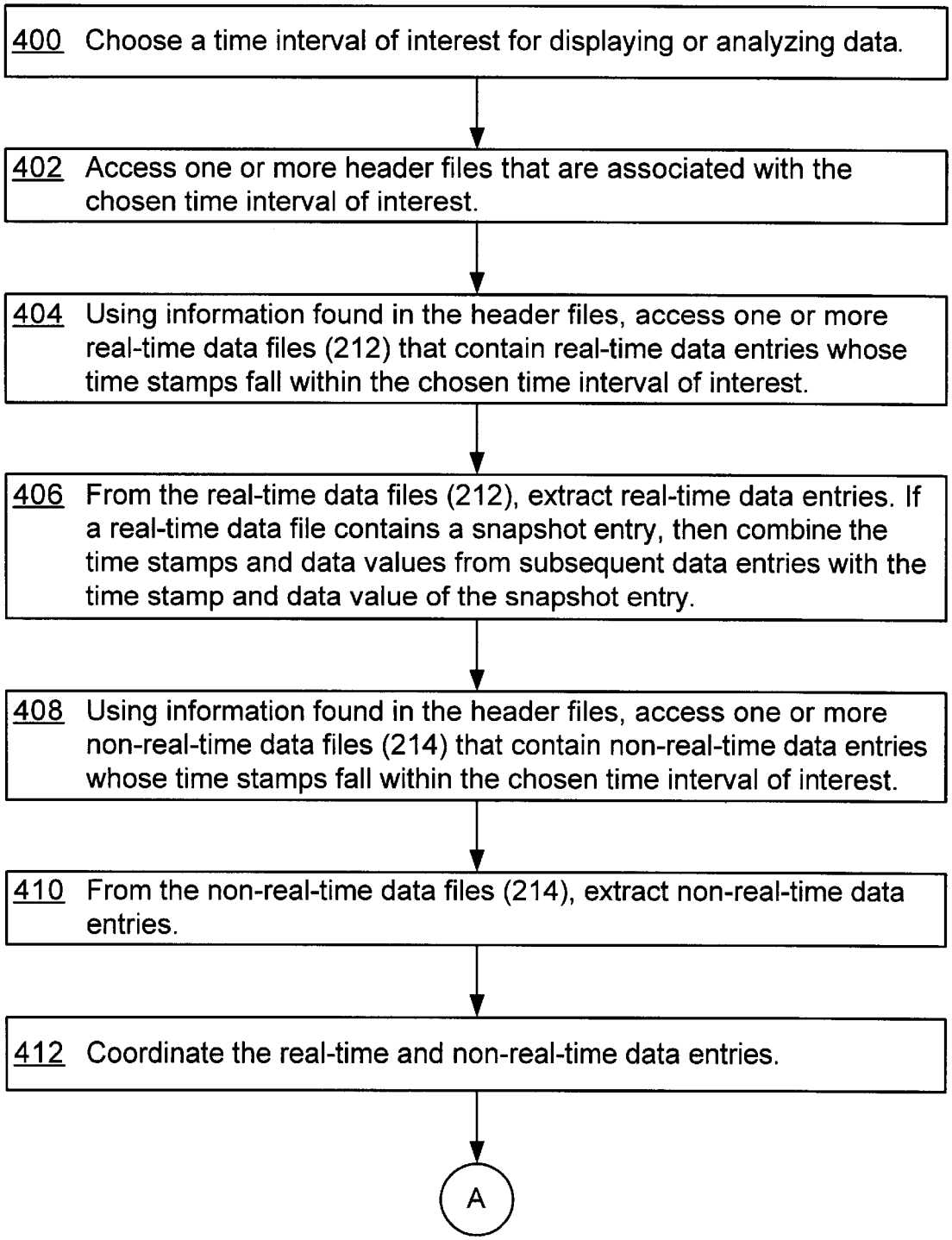
FIGS. 4a and 4b together form a flowchart of an exemplary method for retrieving and analyzing process data.
Figure 4B:
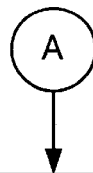

FIGS. 4a and 4b present an exemplary method for accessing the data entries collected and stored by the method of FIGS. 3a and 3b. The method of FIGS. 4a and 4b may be performed under the control of a human operator or may be invoked automatically under the control of the computing device 200.

The method begins in step 400 when an interval of interest is chosen. When an analysis is performed in order to control the process (such as in step 316 of FIG. 3b), this interval may encompass only a few minutes' or even seconds' worth of data entries. A historical perspective can be obtained by selecting an interval of weeks or months.

Based on the chosen time interval of interest, header files are found and accessed in step 402 that are associated with data entries in that interval. The number of header files that are accessed depends upon the length of the time interval and upon particulars of the data storage implementation. Steps 404 and 408 use the header files to access data streams, or data files, that contain relevant data entries.

As discussed above in relation to step 306 of FIG. 3a, the data files may contain snapshot entries. If so, then when the data entries are extracted from the data files in steps 406 and 410, the time delta in the data entry is combined with the time value of the snapshot entry to produce the actual data entry time. Correction factors, if present, are applied here as well.

In step 412, the data entries extracted from the data files are coordinated based on their time stamps into one coherent accumulation of data entries. As discussed above, the relevant data may include just about any data produced in any way and marked as relevant to the time interval of interest.

The relevant data entries are displayed or analyzed in step 414 of FIG. 4b. While FIGS. 4a and 4b show data analysis following data retrieval, such a strict ordering is usually impractical for a large process environment. Instead, some data entries are retrieved. Then those entries are displayed or analyzed while other entries are being retrieved in a constant flow.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that the methods of the present invention are applicable far beyond the industrial sector. Although the invention is described in terms of software modules or components, some processes may be equivalently performed by hardware components. Therefore, the invention as described herein contemplates all such embodiments as may come within the scope of the following claims and equivalents thereof.

We claim:

1. In an environment with a real-time data source and with a non-real-time data source, a method for storing, in a time-coordinated fashion, data received from the real-time and non-real-time data sources, the method comprising:
   receiving real-time data from the real-time data source;
   storing the real-time data as entries in a real-time, streaming data file, the entries time-stamped with times associated with when the real-time data were produced;
   receiving non-real-time data from the non-real-time data source;
   storing the non-real-time data as entries in a non-real-time data file, the entries time-stamped with times of relevance of the non-real-time data; and
   writing a header file that associates a time interval with those entries in the real-time and non-real-time data files whose time stamps fall within the time interval.

2. The method of claim 1 wherein storing data as entries comprises storing the entries in a data file in order of increasing time stamps.

3. The method of claim 1 wherein storing data as entries comprises storing in a data file only those entries whose time stamps fall within the time interval.

4. The method of claim 3 wherein associating the time interval with data entries in a data file comprises associating the time interval with the data file.

5. The method of claim 1 wherein the non-real-time data file comprises a non-real-time database and wherein the non-real-time data entries are keyed by their time stamps.

6. The method of claim 5 wherein the header file comprises a header database and wherein the header and the non-real-time databases are the same database.

7. The method of claim 1 wherein data entries are marked as associated with a data source.

8. The method of claim 7 wherein marking data entries as associated with a data source comprises storing only data received from the data source in a data file and associating the data file with the data source.

9. The method of claim 1 wherein time-stamping the non-real-time data entries with times of relevance comprises stamping a time at which input data were collected, wherein the collected input data were sent as inputs to a process, and wherein the non-real-time data received from the non-real-time data source are outputs of the process.

10. The method of claim 1 wherein writing a header file comprises associating the header file with the real-time and non-real-time data sources.

11. The method of claim 10 further comprising:
associating the header file with another data source, the other data source distinct from the real-time and non-real-time data sources;
wherein associating the header file with the other data source triggers receiving data from the other data source.

12. The method of claim 1 further comprising:
receiving data from another data source, the other data source distinct from the real-time and non-real-time data sources; and
storing the data received from the other data source as entries in a data file selected from the group consisting of: the real-time data file, the non-real-time data file, and another data file.

13. The method of claim 1 further comprising:
storing at least one time-stamped snapshot entry in the real-time data file;
and wherein time-stamping a real-time data entry comprises stamping a period of time between the time stamp of a snapshot entry and a time when the real-time data of the entry were produced.

14. The method of claim 1 further comprising:
storing at least one time-stamped snapshot entry in the non-real-time data file;
and wherein time-stamping a non-real-time data entry comprises stamping a period of time between the time stamp of a snapshot entry and a time of relevance of the non-real-time data.

15. A computer-readable medium containing computer-executable instructions for performing, in an environment with a real-time data source and with a non-real-time data source, a method for storing, in a time-coordinated fashion, data received from the real-time and non-real-time data sources, the method comprising:
receiving real-time data from the real-time data source;
storing the real-time data as entries in a real-time, streaming data file, the entries time-stamped with times associated with when the real-time data were produced;
receiving non-real-time data from the non-real-time data source;
storing the non-real-time data as entries in a non-real-time data file, the entries time-stamped with times of relevance of the non-real-time data; and
writing a header file that associates the time interval with those entries in the real-time and non-real-time data files whose time stamps fall within the time interval.

16. A method for retrieving, in a time-coordinated fashion, data entries from a real-time, streaming data file and from a non-real-time data file, the method comprising:
selecting a time interval of interest;
accessing a header file that associates the time interval of interest with time-stamped data entries in the real-time and non-real-time data files whose time stamps fall within the time interval of interest;
retrieving from the real-time data file data entries associated by the header file with the time interval of interest;
retrieving from the non-real-time data file data entries associated by the header file with the time interval of interest; and
coordinating the retrieval of data entries from the real-time and non-real-time data files based on the time stamps of the data entries.

17. The method of claim 16 wherein all data entries in a data file have time stamps falling within the time interval of interest and wherein the header file associates the time interval of interest with the data file.

18. The method of claim 16 wherein the non-real-time data file comprises a non-real-time database and wherein the non-real-time data entries are keyed by their time stamps.

19. The method of claim 18 wherein the header file comprises a header database and wherein the header and the non-real-time databases are the same database.

20. The method of claim 16 wherein the header file further associates the time interval of interest with time-stamped data entries in another data file whose time stamps fall within the time interval of interest, the other data file distinct from the real-time and non-real-time data files; the method further comprising:
retrieving from the other data file data entries associated by the header file with the time interval of interest; and
coordinating the retrieval of data entries from the other data file based on the time stamps of the data entries.

21. The method of claim 20 wherein at least one entry in the other data file contains a modification to an entry in the real-time data file and wherein retrieving an entry from the real-time data file comprises combining a data value stored with the real-time data entry with a data value stored with the entry in the other data file.

22. The method of claim 16 wherein a data file comprises at least one time-stamped snapshot entry.

23. The method of claim 16 wherein the header file is associated with a real-time data source and with a non-real-time data source; wherein at least some of the real-time data entries in the real-time data file are based on data from the real-time data source; wherein at least some of the non-real-time data entries in the non-real-time data file are based on data from the non-real-time data source; the method further comprising:
selecting one or more data sources; and retrieving only data entries based on data from the selected data sources.

24. A computer-readable medium containing computer-executable instructions for performing a method for retrieving, in a time-coordinated fashion, data entries from a real-time, streaming data file and from a non-real-time data file, the method comprising:

selecting a time interval of interest;

accessing a header file that associates the time interval of interest with time-stamped data entries in the real-time and non-real-time data files whose time stamps fall within the time interval of interest;

retrieving from the real-time data file data entries associated by the header file with the time interval of interest;

retrieving from the non-real-time data file data entries associated by the header file with the time interval of interest; and coordinating the retrieval of data entries from the real-time and non-real-time data files based on the time stamps of the data entries.

25. A computer-readable medium having stored thereon a data structure, the data structure comprising:

a first data field containing data representing a time interval;

a second data field containing data representing a time-stamped entry in a real-time data file whose time stamp falls within the time interval; and a third data field containing data representing a time-stamped entry in a non-real-time data file whose time stamp falls within the time interval.

26. The data structure of claim 25 wherein the data in the second data field represents a time-stamped entry by referring to the real-time data file that contains the time-stamped entry.

27. The data structure of claim 25 wherein the data in the third data field represents a time-stamped entry by referring to the non-real-time data file that contains the time-stamped entry.

28. The data structure of claim 25 further comprising a fourth data field containing data representing an association of the data structure with a data source.

29. The data structure of claim 23 further comprising a fourth data field containing data representing a time-stamped entry in another data file whose time stamp falls within the time interval, the other data file distinct from the real-time and non-real-time data files.

30. The data structure of claim 29 wherein the entry represented by data in the fourth data field contains a modification to the entry represented by data in the second data field.

31. In an environment with a real-time data source and with a non-real-time data source, a system for storing, in a time-coordinated fashion, data received from the real-time and non-real-time data sources, the system comprising:

a time interval;

a real-time, streaming data file;

a non-real-time data file;

a header file; and a data storage coordinator for receiving data from the real-time data source, for storing the real-time data in the real-time data file as entries time-stamped with times associated with when the real-time data were produced, for receiving data from the non-real-time data source, for storing the non-real-time data in the non-real-time data file as entries time-stamped with times of relevance of the non-real-time data, and for associating the header file with those entries in the real-time and non-real-time data files whose time stamps fall within the time interval.

32. The system of claim 31 wherein the data storage coordinator associates the header file with the real-time and non-real-time data sources.

33. The system of claim 32 further comprising a user interface for associating the header file with another data source, the other data source distinct from the real-time and non-real-time data sources, and wherein the data storage coordinator receives data from the other data source and stores the data in a data file as time-stamped entries.

34. The method of claim 1 wherein at least some of the time-stamped real-time and non-real-time data entries measure aspects of an industrial process.

35. The method of claim 16 wherein at least some of the time-stamped real-time and non-real-time data entries measure aspects of an industrial process.

36. The data structure of claim 25 wherein the time-stamped real-time and time data entries measure aspects of an industrial process.

37. The system of claim 31 wherein at least some of the time-stamped real-time and non-real-time data entries measure aspect of an industrial process.

* * * * *